US012655955B1

(12) United States Patent
Jun et al.

(10) Patent No.: US 12,655,955 B1
(45) Date of Patent: Jun. 16, 2026

(54) LAMP FOR VEHICLE

(71) Applicant: HYUNDAI MOBIS CO., LTD., Seoul (KR)

(72) Inventors: Na Ram Jun, Yongin-si (KR); Tae Yang Park, Yongin-si (KR); Hyun Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/289,387

(22) Filed: Aug. 4, 2025

(30) Foreign Application Priority Data

Dec. 12, 2024 (KR) ........................ 10-2024-0184912

(51) Int. Cl.

| | |
|---|---|
| ***F21S 41/275*** | (2018.01) |
| ***F21S 41/143*** | (2018.01) |
| ***F21S 41/20*** | (2018.01) |
| ***F21S 41/40*** | (2018.01) |
| *F21W 102/13* | (2018.01) |
| *F21Y 115/10* | (2016.01) |

(52) U.S. Cl.
CPC ........... *F21S 41/275* (2018.01); *F21S 41/143* (2018.01); *F21S 41/285* (2018.01); *F21S 41/40* (2018.01); *F21W 2102/13* (2018.01); *F21Y 2115/10* (2016.08)

(58) Field of Classification Search
CPC ... F21S 41/275; F21S 41/143; F21W 2102/13
USPC .......................................................... 362/459
See application file for complete search history.

(56) References Cited

U.S. PATENT DOCUMENTS

2024/0055771 A1* 2/2024 Dallal .................... H01Q 15/08

* cited by examiner

*Primary Examiner* — Toan C Ly
(74) *Attorney, Agent, or Firm* — NSIP Law

(57) ABSTRACT

A lamp for a vehicle is provided. The lamp includes a light source, and a micro-cylinder lens part disposed forward of the light source. The micro-cylinder lens part includes micro-lenses disposed in a horizontal direction and physically connected to one another, and the micro-lenses include an asymmetric micro-lens arranged such that an incident surface of each of the micro-lenses has an asymmetrical shape with respect to an axis parallel to a forward/rearward direction (A).

16 Claims, 3 Drawing Sheets

LAMP FOR VEHICLE

CROSS-REFERENCE TO RELATED APPLICATION

This application claims priority to and the benefit under 35 USC § 119(a) of Korean Patent Application No. 10-2024-0184912 filed in the Korean Intellectual Property Office on Dec. 12, 2024, the entire contents of which are incorporated herein by reference for all purposes.

BACKGROUND

1. Field

The present disclosure relates to a lamp, in particular, a lamp for a vehicle.

2. Description of the Related Art

There is an increasing demand for lamps for vehicles with aesthetic appearances as the lamps for vehicles have a significant impact on aesthetic external appearances of the vehicles.

Meanwhile, a lamp for a vehicle generally includes a light source, such as an LED, configured to emit light, and an inner lens. In the related art, an aspherical lens is typically used as the inner lens. However, there is a problem in that a degree of freedom of the aspherical lens remarkably deteriorates in terms of a shape and design thereof. This problem degrades a degree of design freedom of the lamp for a vehicle.

In addition, recently, there has been an attempt to apply a micro-lens such as a micro-cylinder lens or a micro-lens array to a new type of lamp for a vehicle. However, there is a problem in that the lamp for a vehicle, to which the micro-lens is applied, is difficult to manufacture because it is difficult to manage a tolerance during an assembling process.

In particular, because a micro-lens applied to an optical system has a very small width of several millimeters, there is a problem in that glare occurs in case that light emitted from a light source enters another micro-lens positioned at a periphery of the micro-lens positioned forward of the light source without entering the micro-lens positioned forward of the light source. A case in which a separate light-blocking member is installed may be considered to remove the glare. However, in this case, a dark area occurs in the vicinity of a region in which the light-blocking member is installed, which causes a problem in that overall uniformity of a light-emitting surface of the lamp deteriorates.

SUMMARY

The present disclosure has been made in an effort to improve uniformity of a light-emitting surface of a lamp while solving a problem of glare that may occur in the lamp for a vehicle to which a micro-lens is applied.

In a general aspect, a lamp for a vehicle includes: a light source; and a micro-cylinder lens part disposed forward of the light source, wherein the micro-cylinder lens part comprises a plurality of micro-lenses disposed in a horizontal direction and physically connected to one another, and wherein the plurality of micro-lenses in the micro-cylinder lens part comprise an asymmetric micro-lens configured such that an incident surface of each of the micro-lenses has an asymmetrical shape with respect to an axis parallel to a forward/rearward direction (A).

The plurality of micro-lenses in the micro-cylinder lens part may further include a symmetric micro-lens configured such that an incident surface of the micro-lens has a symmetrical shape with respect to the axis parallel to the forward/rearward direction (A).

The lamp may further include an inner lens part provided between the light source and the micro-cylinder lens part, wherein the inner lens part includes a plurality of unit lenses provided to be spaced apart from one another in the horizontal direction, and wherein the asymmetric micro-lens is configured to face a space between the two adjacent unit lenses in the forward/rearward direction (A).

The symmetric micro-lens may be configured to face the unit lens in the forward/rearward direction (A).

The asymmetric micro-lens may include a plurality of asymmetric micro-lenses, wherein at least some of the plurality of asymmetric micro-lenses are connected to one another to constitute an asymmetric micro-lens group, and wherein the asymmetric micro-lens group is provided to face the space between the two adjacent unit lenses in the forward/rearward direction (A).

The asymmetric micro-lens group may have a symmetrical shape with respect to a central axis (X) parallel to the forward/rearward direction (A).

An incident surface of the asymmetric micro-lens in the asymmetric micro-lens group may have a shape inclined toward the central axis (X) of the asymmetric micro-lens group parallel to the forward/rearward direction (A).

A width of the asymmetric micro-lens group in a leftward/rightward direction (W) may be smaller than a width between the two adjacent unit lenses in the leftward/rightward direction (W).

The lamp may further include a blocking member disposed between the two adjacent unit lenses, wherein the blocking member is provided to face the asymmetric micro-lens group in the forward/rearward direction (A).

A front end of the blocking member may be positioned forward of a front end of the unit lens.

An emergent surface of the asymmetric micro-lens in the asymmetric micro-lens group may have a vertically symmetrical shape with respect to the axis parallel to the forward/rearward direction (A).

In another general aspect, a lamp for a vehicle includes: a light source; a micro-cylinder lens part, disposed forward of the light source, and comprising a plurality of micro-lenses that are disposed in a horizontal direction and connected to one another; and an inner lens part, provided between the light source and the micro-cylinder lens part, and comprising a plurality of unit lenses provided to be spaced apart from one another in the horizontal direction, wherein one or more of the plurality of micro-lenses includes an asymmetric micro-lens configured to face a space between the two adjacent unit lenses in the forward/rearward direction (A), such that an incident surface of one or more of the micro-lenses has an asymmetrical shape with respect to an axis parallel to the forward/rearward direction (A), and a symmetric micro-lens configured such that an incident surface of one or more of the micro-lenses has a symmetrical shape with respect to the axis parallel to the forward/rearward direction (A).

The asymmetric micro-lens may include a plurality of asymmetric micro-lenses, wherein at least some of the plurality of asymmetric micro-lenses are connected to one another to constitute an asymmetric micro-lens group, and wherein the asymmetric micro-lens group is provided to face the space between the two adjacent unit lenses in the forward/rearward direction (A).

The asymmetric micro-lens group may have a symmetrical shape with respect to a central axis (X) parallel to the forward/rearward direction (A).

A width of the asymmetric micro-lens group in a leftward/rightward direction (W) may be smaller than a width between the two adjacent unit lenses in the leftward/rightward direction (W).

A blocking member may be disposed between the two adjacent unit lenses, wherein the blocking member is provided to face the asymmetric micro-lens group in the forward/rearward direction (A).

According to the present disclosure, it is possible to improve the uniformity of the light-emitting surface of the lamp while solving a problem of glare that may occur in the lamp for a vehicle to which the micro-lens is applied.

DETAILED DESCRIPTION

Hereinafter, a lamp for a vehicle according to the present disclosure will be described with reference to the drawings.

Lamp for Vehicle

Figure 1:
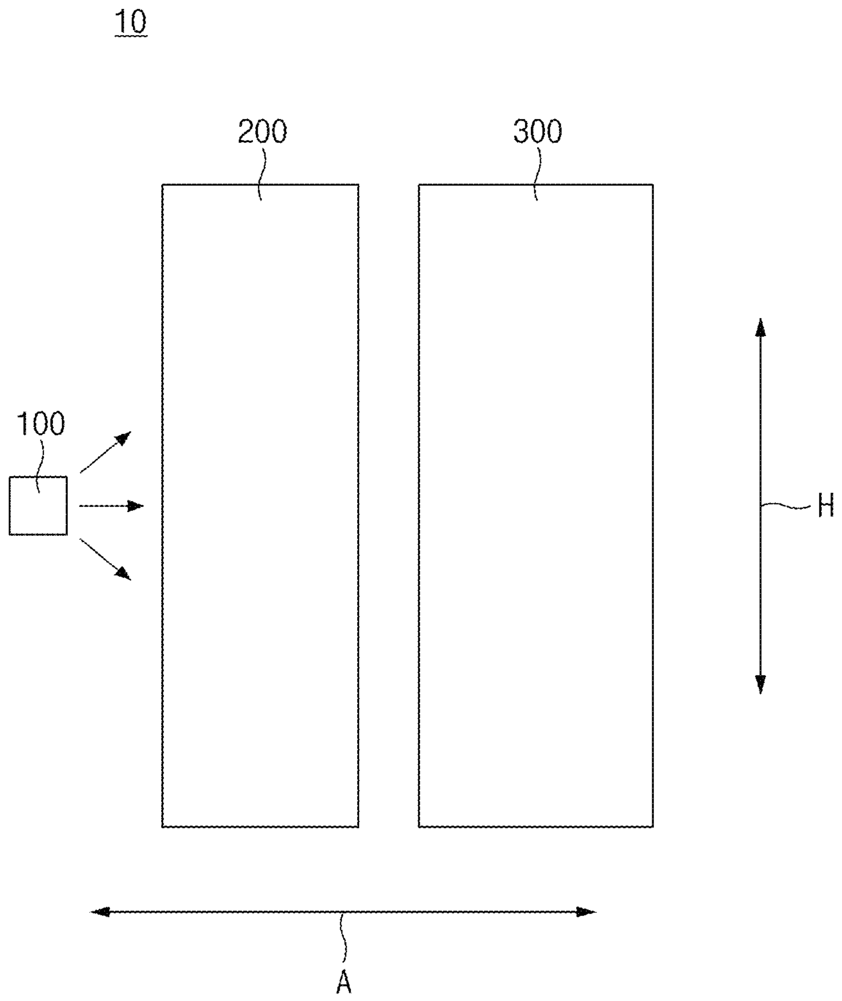
FIG. 1 is a side view schematically illustrating main components of a lamp for a vehicle according to the present disclosure.
Figure 2:
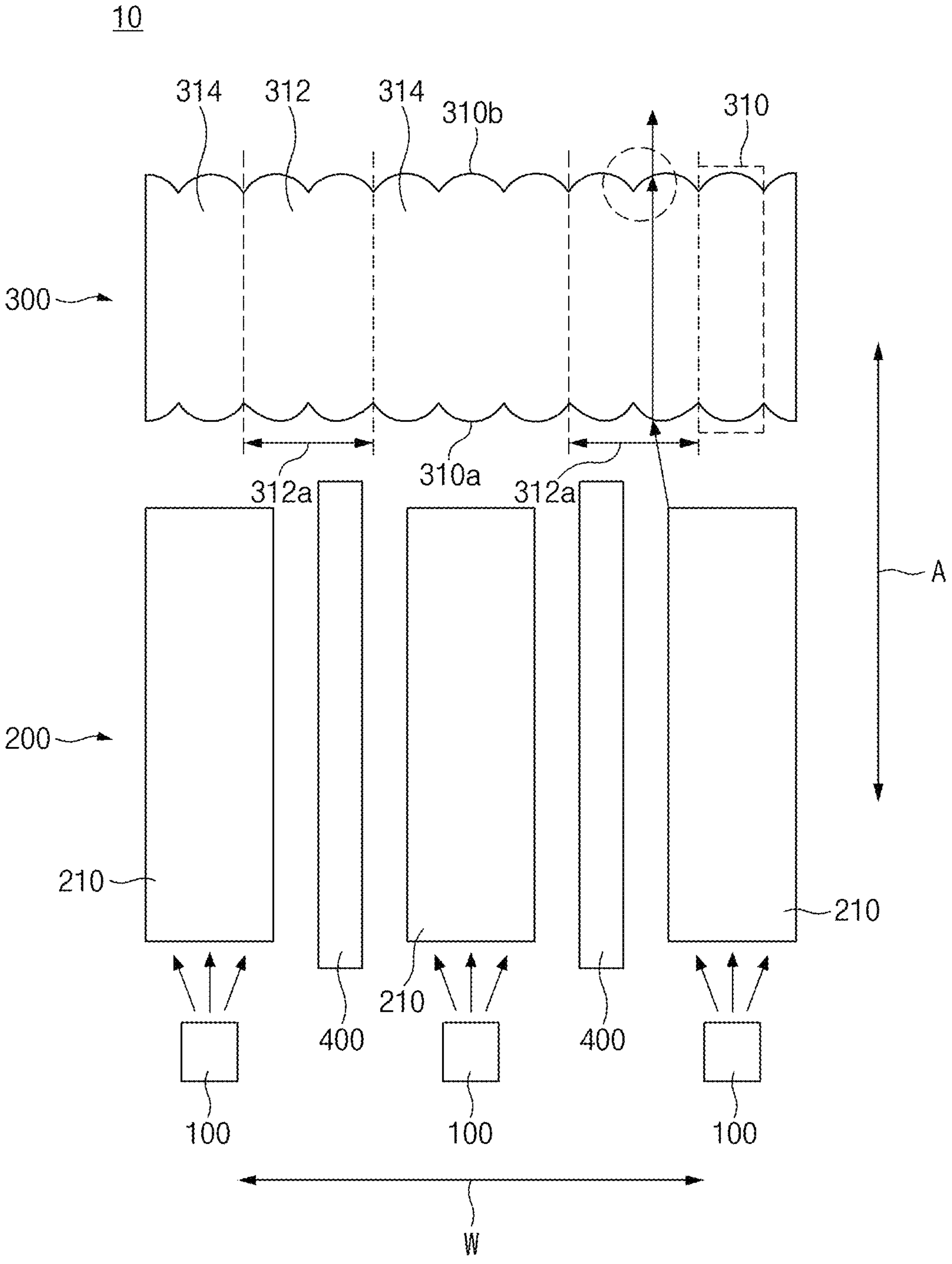
FIG. 2 is a top plan view of the lamp for a vehicle according to the present disclosure.
Figure 3:
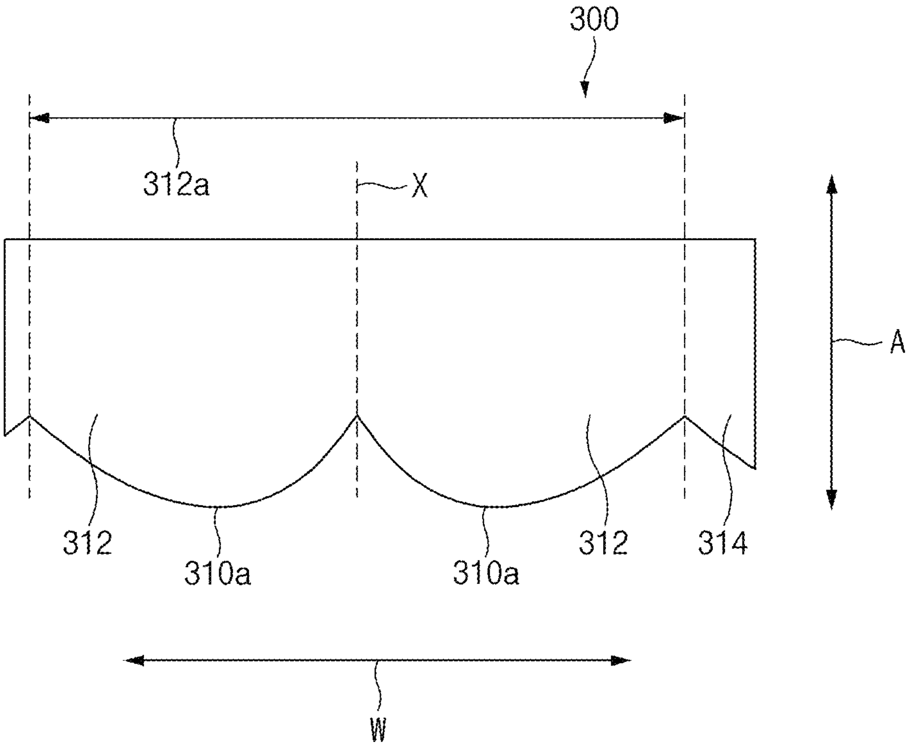
FIG. 3 is an enlarged view illustrating an asymmetric micro-lens group provided in a micro-cylinder lens part of the lamp for a vehicle according to the present disclosure.

FIG. 1 is a side view schematically illustrating main components of a lamp for a vehicle according to the present disclosure, and FIG. 2 is a top plan view of the lamp for a vehicle according to the present disclosure. FIG. 3 is an enlarged view illustrating an asymmetric micro-lens group provided in a micro-cylinder lens part of the lamp for a vehicle according to the present disclosure.

The lamp for a vehicle (hereinafter, referred to as a 'lamp') according to the present disclosure may be configured to create a low-beam light distribution pattern or a high-beam light distribution pattern. However, the lamp according to the present disclosure may, of course, be configured to create other types of light distribution patterns.

With reference to FIGS. 1 and 2, a lamp 10 according to the present disclosure may include light sources 100 configured to emit light, and a micro-cylinder lens part 300 provided forward of the light sources 100. For example, the light source 100 may be an LED.

Meanwhile, according to the present disclosure, the micro-cylinder lens part 300 may include a plurality of micro-lenses 310 disposed in a horizontal direction and physically connected to one another. More specifically, the micro-cylinder lens part 300 may have a structure in which the plurality of micro-lenses 310 are arranged in the horizontal direction. A width of the micro-lens 310 in a leftward/rightward direction W may be several millimeters to several centimeters. Meanwhile, the micro-cylinder lens part disclosed in the present specification is configured such that the plurality of micro-lenses are connected and integrated. Therefore, it is noted that the micro-cylinder lens part is distinguished from a micro-lens array or the like in which separate incident lens arrays are joined to one another with shield members interposed therebetween.

Meanwhile, the lamp 10 according to the present disclosure may further include an inner lens part 200 provided between the light sources 100 and the micro-cylinder lens part 300. More specifically, the inner lens part 200 may be provided forward of the light source 100 and provided rearward of the micro-cylinder lens part 300. As illustrated in FIG. 1, the light sources 100 may face the inner lens part 200 and the micro-cylinder lens part 300 that are arranged in a forward/rearward direction H.

In addition, according to the present disclosure, the inner lens part 200 may include a plurality of regions physically spaced apart from one another. More specifically, as illustrated in FIG. 2, the inner lens part 200 may include a plurality of unit lenses 210 provided to be spaced apart from one another in the horizontal direction (e.g., the leftward/rightward direction W). The plurality of unit lenses 210 in the inner lens part 200 may be provided to face one micro-cylinder lens part 300 in a forward/rearward direction A. Meanwhile, the light sources 100 may also be provided as a plurality of light sources 100 provided in the lamp 10 while corresponding to the number of unit lenses 210 in the inner lens part 200.

Meanwhile, according to the present disclosure, the plurality of unit lenses 210 may each optically correspond to the plurality of micro-lenses 310. In this case, it can be seen that one unit lens 210 optically corresponds to the plurality of micro-lenses 310 in case that light, which is emitted from the light source 100 and enters one unit lens 210, enters some of the plurality of micro-lenses 310 that constitute the micro-cylinder lens part 300.

With continued reference to FIG. 2, the lamp 10 according to the present disclosure may further include blocking members 400 each provided between the two unit lenses 210 adjacent to each other. More specifically, the blocking member 400 may be configured to block the propagation of light that is emitted from the light source 100 and reaches the blocking member 400. Therefore, according to the present disclosure, the blocking member 400 may be made of a material capable of blocking light in a visible wavelength region. More particularly, the blocking member 400 may have a color (e.g., black) that may absorb the light emitted from the light source 100. For example, as illustrated in FIG. 2, a front end of the blocking member 400 may be positioned forward of a front end of the unit lens 210.

According to the present disclosure, the blocking member 400 may be configured to prevent glare by preventing the light emitted from the light source 100 from reaching another unit lens 210 disposed at a periphery of the unit lens 210 positioned forward of the light source 100 without reaching the unit lens 210 positioned forward of the light source 100. However, in case that the light is blocked by the blocking member 400, almost no light may reach a region of the micro-cylinder lens part 300 that faces the blocking member 400 in the forward/rearward direction A. In this case, a dark area may be formed in the micro-cylinder lens part 300, which may cause a problem in that a light-emitting surface of the micro-cylinder lens part 300 is not uniform. Therefore, the lamp according to the present disclosure may further include a feature for preventing the non-uniform light-emitting surface described above.

Therefore, in order to achieve the above-mentioned purpose, as illustrated in FIGS. 2 and 3, according to the present disclosure, the plurality of micro-lenses 310 in the micro-cylinder lens part 300 may include asymmetric micro-lenses 312 each configured such that an incident surface 310*a* of the micro-lens 310 has a vertically asymmetrical shape with respect to an axis parallel to the forward/rearward direction A. Therefore, an optical path of the light entering the asymmetric micro-lens 312 may be different from an optical path of the light entering another micro-lens 310 in the micro-cylinder lens part 300.

Meanwhile, according to the present disclosure, the plurality of micro-lenses 310 in the micro-cylinder lens part 300 may further include symmetric micro-lenses 314 each configured such that the incident surface 310*a* of the micro-lens 310 has a vertically symmetrical shape with respect to the axis parallel to the forward/rearward direction A. That is, according to the present disclosure, the asymmetric micro-lens 312 and the symmetric micro-lens 314 may be provided in the micro-cylinder lens part 300.

The asymmetric micro-lens 312 according to the present disclosure may be configured to uniformize a light-emitting surface of the micro-cylinder lens part 300. Therefore, the asymmetric micro-lens 312 may be provided at a portion where a dark area may occur in case that the asymmetric micro-lens 312 is not present.

That is, with reference to FIGS. 2 and 3, the asymmetric micro-lens 312 may be provided to face a space between the two adjacent unit lenses 210 in the forward/rearward direction A. In this case, because the blocking member 400 is provided between the two adjacent unit lenses 210, the blocking member 400 may be provided to face an asymmetric micro-lens group 312*a* in the forward/rearward direction A. In contrast, the symmetric micro-lens 314 may be provided to face the unit lens 210 in the forward/rearward direction A.

Meanwhile, the above-mentioned asymmetric micro-lenses 312 may be provided as a plurality of asymmetric micro-lenses 312. In this case, at least some of the plurality of asymmetric micro-lenses 312 are provided to be connected to one another, such that the asymmetric micro-lens group 312*a* may be formed. The asymmetric micro-lens group 312*a* may be provided to face the space between the two adjacent unit lenses 210 in the forward/rearward direction A. Hereinafter, the characteristics of the asymmetric micro-lens group 312*a* will be described in detail.

With reference to FIG. 3, the asymmetric micro-lens group 312*a* may have a vertically symmetrical shape with respect to a central axis X parallel to the forward/rearward direction A. That is, according to the present disclosure, the asymmetric micro-lenses 312 included in the asymmetric micro-lens group 312*a* may each have a vertically asymmetrical shape. However, the asymmetric micro-lens group 312*a* formed by collecting the asymmetric micro-lenses 312 may have a vertically symmetrical shape.

More specifically, as illustrated in FIG. 3, the incident surface 310*a* of the asymmetric micro-lens 312 in the asymmetric micro-lens group 312*a* may have a shape inclined toward the central axis X of the asymmetric micro-lens group 312*a* parallel to the forward/rearward direction A. That is, the asymmetric micro-lens 312 in the asymmetric micro-lens group 312*a* may have a shape convex rearward and inclined toward the central axis X in the leftward/rightward direction.

Meanwhile, according to the present disclosure, the asymmetric micro-lens group 312*a* may be provided as a plurality of asymmetric micro-lens groups 312*a* spaced apart from one another in the leftward/rightward direction W in the micro-cylinder lens part 300. In this case, a width of each of the asymmetric micro-lens groups 312*a* in the leftward/rightward direction W may be smaller than a width between the two adjacent unit lenses 210 in the leftward/rightward direction W and larger than a width in the leftward/rightward direction W of the blocking member 400 provided between the two adjacent unit lenses 210.

In addition, as described above, the curvature characteristics of the incident surface 310*a* of the asymmetric micro-lens 312 may be different from the curvature characteristics of the incident surface 310*a* of the symmetric micro-lens 314. However, curvature characteristics of an emergent surface 310*b* of the asymmetric micro-lens 312 may correspond to the curvature characteristics of the incident surface 310*a* of the symmetric micro-lens 314. More specifically, i) the emergent surface 310*b* of the symmetric micro-lens 314 and ii) the emergent surface 310*b* of the asymmetric micro-lens 312 in the asymmetric micro-lens group 312*a* may each have a vertically symmetrical shape with respect to the axis parallel to the forward/rearward direction A.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:

a light source; and a micro-cylinder lens part disposed forward of the light source, wherein the micro-cylinder lens part comprises a plurality of micro-lenses disposed in a horizontal direction and physically connected to one another, and wherein the plurality of micro-lenses in the micro-cylinder lens part comprise an asymmetric micro-lens configured such that an incident surface of each of the micro-lenses has an asymmetrical shape with respect to an axis parallel to a forward/rearward direction (A).

2. The lamp of claim 1, wherein the plurality of micro-lenses in the micro-cylinder lens part further comprise a symmetric micro-lens configured such that an incident surface of the micro-lens has a symmetrical shape with respect to the axis parallel to the forward/rearward direction (A).

3. The lamp of claim 1, further comprising:

an inner lens part provided between the light source and the micro-cylinder lens part, wherein the inner lens part comprises a plurality of unit lenses provided to be spaced apart from one another in the horizontal direction, and wherein the asymmetric micro-lens is configured to face a space between the two adjacent unit lenses in the forward/rearward direction (A).

4. The lamp of claim 3, wherein the symmetric micro-lens is configured to face the unit lens in the forward/rearward direction (A).

5. The lamp of claim 3, wherein the asymmetric micro-lens comprises a plurality of asymmetric micro-lenses, wherein at least some of the plurality of asymmetric micro-lenses are connected to one another to constitute an asymmetric micro-lens group, and wherein the asymmetric micro-lens group is provided to face the space between the two adjacent unit lenses in the forward/rearward direction (A).

6. The lamp of claim 5, wherein the asymmetric micro-lens group has a symmetrical shape with respect to a central axis (X) parallel to the forward/rearward direction (A).

7. The lamp of claim 6, wherein an incident surface of the asymmetric micro-lens in the asymmetric micro-lens group has a shape inclined toward the central axis (X) of the asymmetric micro-lens group parallel to the forward/rearward direction (A).

8. The lamp of claim 7, wherein an emergent surface of the asymmetric micro-lens in the asymmetric micro-lens group has a vertically symmetrical shape with respect to the axis parallel to the forward/rearward direction (A).

9. The lamp of claim 5, wherein a width of the asymmetric micro-lens group in a leftward/rightward direction (W) is smaller than a width between the two adjacent unit lenses in the leftward/rightward direction (W).

10. The lamp of claim 5, further comprising:

a blocking member disposed between the two adjacent unit lenses, wherein the blocking member is provided to face the asymmetric micro-lens group in the forward/rearward direction (A).

11. The lamp of claim 9, wherein a front end of the blocking member is positioned forward of a front end of the unit lens.

12. A lamp for a vehicle, the lamp comprising:

a light source;

a micro-cylinder lens part, disposed forward of the light source, and comprising a plurality of micro-lenses that are disposed in a horizontal direction and connected to one another; and an inner lens part, provided between the light source and the micro-cylinder lens part, and comprising a plurality of unit lenses provided to be spaced apart from one another in the horizontal direction, wherein one or more of the plurality of micro-lenses comprises:

an asymmetric micro-lens configured to face a space between the two adjacent unit lenses in the forward/rearward direction (A), such that an incident surface of one or more of the micro-lenses has an asymmetrical shape with respect to an axis parallel to the forward/rearward direction (A); and a symmetric micro-lens configured such that an incident surface of one or more of the micro-lenses has a symmetrical shape with respect to the axis parallel to the forward/rearward direction (A).

13. The lamp of claim 12, wherein the asymmetric micro-lens comprises a plurality of asymmetric micro-lenses, wherein at least some of the plurality of asymmetric micro-lenses are connected to one another to constitute an asymmetric micro-lens group, and wherein the asymmetric micro-lens group is provided to face the space between the two adjacent unit lenses in the forward/rearward direction (A).

14. The lamp of claim 13, wherein the asymmetric micro-lens group has a symmetrical shape with respect to a central axis (X) parallel to the forward/rearward direction (A).

15. The lamp of claim 13, wherein a width of the asymmetric micro-lens group in a leftward/rightward direction (W) is smaller than a width between the two adjacent unit lenses in the leftward/rightward direction (W).

16. The lamp of claim 13, further comprising:

a blocking member disposed between the two adjacent unit lenses, wherein the blocking member is provided to face the asymmetric micro-lens group in the forward/rearward direction (A).

* * * * *